United States Patent [19]
Mansure

[11] 4,163,742
[45] Aug. 7, 1979

[54] PROCESS AND PRODUCT PREPARED FROM TETRAFLUOROETHYLENE RESIN AND GRAPHITE FIBERS

[75] Inventor: Jacob F. Mansure, Wilmington, Del.

[73] Assignee: E. I. Du Pont de Nemours and Company, Wilmington, Del.

[21] Appl. No.: 876,339

[22] Filed: Feb. 9, 1978

[51] Int. Cl.² .......................... C08K 3/04; C08K 7/06
[52] U.S. Cl. .............................. 260/42.17; 260/42.27; 260/42.54; 260/42.55
[58] Field of Search ............... 260/42.17, 42.54, 42.27, 260/42.55

[56] References Cited
U.S. PATENT DOCUMENTS 3,793,287  2/1974  Fitz et al. .......................... 260/42.27

FOREIGN PATENT DOCUMENTS 2354848  7/1975  Fed. Rep. of Germany ........ 260/42.17
1462046  1/1977  United Kingdom .................. 260/42.27

Primary Examiner—James H. Derrington

[57] ABSTRACT

An intimate blend of a melt-fabricable tetrafluoroethylene copolymer resin and graphite reinforcing fibers is obtained by intimately blending the resin and fibers in a mixture of water and a selected water-miscible organic solvent. Composites molded from the blend have high flexural modulus and tensile strength, and outstanding resistance to creep.

7 Claims, 4 Drawing Figures

PROCESS AND PRODUCT PREPARED FROM TETRAFLUOROETHYLENE RESIN AND GRAPHITE FIBERS

This invention relates to melt-fabricable reinforced tetrafluoroethylene resins.

BACKGROUND OF THE INVENTION

Fibrous fillers, such as asbestos, glass, or graphite fibers, have been used to improve mechanical properties of non-melt-fabricable polytetrafluoroethylene resins. While some properties are improved by the presence of these fillers, improvement in other properties is desirable. For example, these fillers did not heretofore provide adequate compressive creep resistance to molded parts made from the filled resins, especially at high temperatures and high loads.

SUMMARY OF THE INVENTION

It has now been found that reinforced resins having excellent compressive creep resistance and good tensile properties when molded are obtained by a blend of a major portion of a melt-fabricable tetrafluoroethylene copolymer resin and a minor portion of graphite fibers, in which the copolymer forms clumps along substantially the length of the graphite fibers so as to substantially cover the surface of the fibers.

The blend is obtained by mixing the resin and the fibers in a mixture of water and a water-miscible organic solvent.

DESCRIPTION OF THE INVENTION

Figure 1A:
FIGS. 1a, 1b and 1c are phtographs taken at a magnification of 36x of mixtures of melt-fabricable tetrafluoroethylene resin and graphite fibers mixed according to prior art methods.

The tetrafluoroethylene copolymer resins employed herein are melt-fabricable ones, as opposed to non-melt-fabricable resins typified by the homopolymer, polytetrafluoroethylene. Generally, polymers of the non-melt-fabricable variety have melt viscosities of $1 \times 10^9$ poises or more at 380° C., whereas melt-fabricable tetrafluoroethylene copolymers have sufficient comonomer to lower the crystalininty after melt fabrication to permit useful properties to be maintained at a melt viscosity of $1 \times 10^4$–$1 \times 10^7$ poises at 380° C.

The melt viscosity of useful copolymers depends on the amount of comonomer present. Generally, the more comonomer present, the lower the melt viscosity. Thus, the melt-fabricable tetrafluoroethylene copolymers employed herein comprise copolymers of tetrafluoroethylene and a different perfluorinated ethylenically unsaturated organic copolymerizable monomer present in an amount which allows the melt viscosity of the resultant copolymer to be below $1 \times 10^7$ poise at 380° C. One preferred class of ethylenically unsaturated monomers is the perfluoro (alkyl vinyl ethers) of 3–7 carbon atoms. Generally, the copolymer can contain 0.5–20% by weight of these comonomers. Another preferred class is the perfluoro (terminally unsaturated olefins) of 3–7 carbon atoms. Generally, the copolymer can contain up to about 10–25% by weight of these comonomers. If less than the amount specified is present, the copolymer described above will not be melt-fabricable; on the other hand, if more than the amount specified is present, the copolymer will become elastomeric. The resin particles should have an average size below μm and preferably below 20 μm. Ordinarily the size will be between 5 μm and 20 μm.

Any graphite fibers can be employed to reinforce the tetrafluoroethylene copolymer resin. Preferably the fibers have tensile strengths of at least 200,000 psi and an average length of at least 2 mm. and preferably between 2-30 mm. Fibers less than 2 mm. long tend to result in moldings of less strength than when the fibers are longer. The fibers preferably have an aspect ratio of at least 100 and most preferably between 200 and 1500.

To prepare the blend of copolymer and fiber, the two are mixed, together or separately, in any order in an aqueous medium containing a water-miscible organic solvent. By "water-miscible" is meant that the solvent is soluble in water to the extent of at least 25% by weight. Preferably, the solvent is soluble in water in all proportions.

The amount of copolymer resin in the blend is between 50–99% by weight of mixture, and preferably 80–99% (the remainder being graphite fiber). The amount of graphite fiber in the aqueous mixture can be between about 5 and 30 gm. per 1,000 gm. of mixture. The amount of organic solvent in the aqueous medium can be 1–90% by weight of medium but preferably is between 5–25%.

The organic solvent can be any water-miscible aliphatic (preferably alkyl) ketone, alcohol, or glycol, containing up to 8 carbon atoms. Examples of such solvents include acetone, methyl ethyl ketone, methanol, ethanol, isopropyl alcohol, t-butyl alcohol, and propylene glycol. Isopropyl alcohol or acetone are preferred.

Temperature and pressure are not critical in the preparation of the blend and usually atmospheric conditions are employed during blending.

Preferably, the polymer is wet with a small amount of the organic solvent, then sufficient water is added to provide an aqueous solution of solvent within the range specified above, followed by addition of graphite fiber, and then by stirring. Stirring is carried out vigorously to thoroughly mix the ingredients. Usually, a Waring Blender is employed. The resulting blend is separated from the aqueous mixture (usually by filtering) and is dried, e.g., in vacuum at an elevated temperature (e.g., 100°–120° C.).

Figure 1B:

FIG. 1 depicts reinforced tetrafluoroethylene copolymer resins prepared by prior art methods. In each, the resin employed was a copolymer of tetrafluoroethylene and about 2.9 weight percent of perfluoro (propyl vinyl ether). The average particle size of copolymer was about 5 μm. The graphite fiber content of the blend was about 5 weight percent. The fibers had an average length of 6 mm. In FIG. 1a, the resin and fibers were blended by dry mixing by tumbling. In FIG. 1b, the copolymer and fibers were mixed in an aqueous solution containing

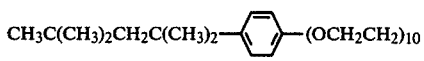

Figure 1C:
Figure 2:
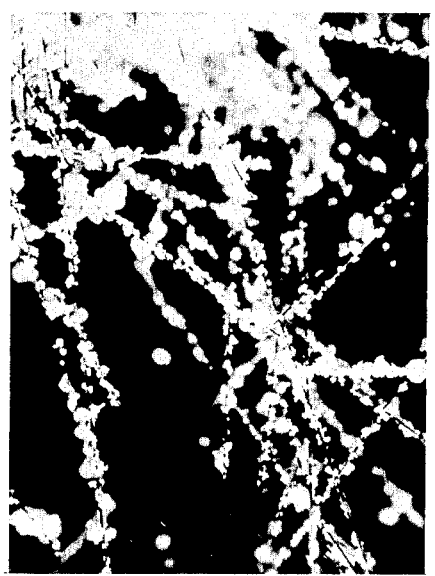
FIG. 2 is a photograph taken at a magnification of 37x of the blend of this invention mixed according to the process of this invention.

OH ("Triton" X-100 surfactant); while in FIG. 1c, the copolymer and fibers were mixed in an aqueous solution containing sodium lauryl sulfonate ("Duponol" ME). In FIG. 2 the copolymer and fibers, identical to the ones described for the FIG. 1, were mixed by the process of this invention. The greater degree of clustering around substantially the length of the fibers by the resin particles in FIG. 2 can be seen by comparing the figures. It is seen that substantially the length of the fibers is covered by small clumps of copolymer. This results in easy filtering of the blend after mixing, little separation of fiber and resin particles during filtration, and good handling in subsequent fabrication.

It is believed that these advantages, as well as improved compressive creep resistance, are due to the good adherence to, and coverage of, the fibers by the copolymer. Such adherence and coverage is conveniently measured by measuring the resistivity of a molding made from the blend. The greater the coverage by the resin on the fiber surface, the greater the electrical resistivity of moldings made from the blend. It has been found that generally moldings of the resins of this invention have an electrical resistivity of several times that of moldings obtained by blending the copolymer and graphite fibers by other known methods.

Compression moldings of the reinforced resin exhibit substantially no creep, thus the resin is useful to make gaskets, valve seats, and seals, especially for use where such articles are subjected to high temperatures and corrosive materials. In some samples tested, creep of a resin of this invention was reduced from 15% to less than one percent after 100 hours at 235° C. and 1,000 psi (6.9 MPa) in the pressing directions over creep of a sample of melt-fabricable resin containing no graphite fiber. In addition, moldings of the resin of this invention exhibit good flexural and tensile strength.

In the Examples which are provided below, physical parameters employed therein were determined as follows:

Melt viscosity of the tetrafluoroethylene copolymers is measured according to ASTM D-1238-52T modified by (1) using a cylinder, orifice and piston tip made of a corrosion-resistance alloy, Haynes Stellite 19, (2) charging a 5.0 g sample to the 9.53 mm inside diameter cylinder which is maintained at 372° C.±1° C., 3) extruding the sample 5 minutes after charging through a 2.10 mm diameter, 8.00 mm long square-edged orifice under a load (piston plus weight) of 5000 g (this corresponds to a shear stress of 0.457 kg/cm$^2$). The melt viscosity in poise is calculated as 53150 divided by the observable extrusion rate in grams per minute and recalculated for conversion to 380° C. by multiplying by 0.92.

Average particle size of resin and fibers is measured by optical microscopy.

Compressive creep resistance is measured by ASTM test D-621-64 modified by measuring deformation at intervals up to 144 hours and at temperatures of 235° C. or 260° C.

Flexural modulus, flexural strength, tensile strength and elongation are determined by ASTM test D-790-71 and D-1708-66.

The following Examples illustrate the invention:

EXAMPLE 1

Finely divided powder of a melt-fabricable copolymer of tetrafluoroethylene and 3.0 wt % perfluoro (propyl vinyl ether) of melt viscosity about $4.0 \times 10^4$ poise at 380° C. and an average particle size of about 5 μm was blended in a Waring Blender with 20% acetone/80% water (by volume). The acetone was added first to thoroughly wet the resin and then the water was added. To this suspension of resin in solvent were added Hercules "Magnamite", Type AS, graphite fibers having an average length of about 6 mm. The mixture was vigorously stirred for two minutes. Six preparations were made using the following quantities:

|   | Wt. % Fibers | Fibers (grams) | Resin (grams) | Solvent* (liters) |
|---|---|---|---|---|
| A | 5 | 28.5 | 541.9 | 3.5 |
| B | 10 | 56.5 | 508.7 | 3.5 |
| C | 20 | 111.2 | 443.6 | 7.0 |
| D | 30 | 163.2 | 381.0 | 10.5 |
| E | 40 | 213.6 | 320.2 | 14.0 |
| F | 50 | 261.7 | 261.7 | 17.5 |

*Capacity of 1 gal Waring Blender is 3500 ml so larger runs were split into 2-5 batches and recombined during filtration The blend was filtered in an 8"×8" filter to give an 8"×8" pre-form. Samples were compression molded into 8"×8" × approximately ¼" specimens at 340° C. and 940 psi for 30 minutes.

COMPARISON WITH EXAMPLE 1

The copolymer and the graphite fibers described in Example 1 were combined to give 5, 20, and 40% fiber compositions using the quantities specified in Example 1. In these examples the resin and fibers were blended in an aqueous mixture containing 0.1% by weight of sodium lauryl sulfonate ("Duponol" ME) rather than the 20% acetone/80% water medium. Blending time, filtration and molding conditions were identical with Example 1.

ELECTRICAL RESISTIVITY OF EXAMPLE 1 SAMPLES AND COMPARISON SAMPLES

Electrical resistivity was measured by cutting strips ¼" wide and 8 cm long so that test specimens about ¼" square and 8 cm long were obtained. A 1/16" diameter hole was drilled longitudinally in each end ¼" deep. A ¼" #4 brass screw was inserted in each end to the depth of 0.5 cm so that the electrical path between screws was 7 cm. The resistance of the test piece was measured to the nearest 0.1 ohm with a digital-type ohm-meter. Resistivity in ohm-cm is calculated by multiplying the measured resistance in ohms by the cross-sectional area of the test specimen in square centimeters and dividing by the length of the electrical path in centimeters, as shown by the following equation:

$$\text{Resistivity} = \text{Measured Resistance} \frac{\text{(Cross-sectional Area)}}{\text{(Path Length)}}$$

Resistivity values for the samples prepared as described above were as follows:

| | Resistivity (Ohm-cm) | |
|---|---|---|
| Wt. % Graphite Fibers | Acetone/Water Blending | "Duponol" ME Blending |
| 5 | 6.75 | 2.32 |
| 10 | .41 | |
| 20 | .14 | 0.041 |
| 30 | .069 | |
| 40 | .047 | 0.030 |
| 50 | .055 | |

The table shows that resistivity is greater in blends prepared according to the procedure of the invention than in blends prepared by the "Duponol" ME procedure. This greater resistivity is attributed to better coverage of the graphite fibers by the copolymer particles in the blends of this invention than in blends obtained by the "Duponol" ME procedure. The better coverage is evident from examination of FIG. 2 (which depicts a blend of this invention) and FIG. 1c (which depicts a blend prepared by the "Duponol" ME procedure).

EXAMPLE 2

In a one-gallon size Waring Blender were mixed 475 grams of finely divided melt-fabricable copolymer of tetrafluoroethylene and 2.9 wt.% perfluoro (propyl vinyl ether) of melt viscosity of about $3.1 \times 10^4$ poise at 380° C. and an average particle size of about 5μm, and 25 grams of the graphite fibers of Example 1, 500 ml acetone, and 2000 ml of water. The mixing operation was carried out by first wetting the copolymer resin with acetone, then adding the water, and finally adding the graphite fibers. The mixing operation was repeated four times and the four lots were combined in a single filtration operation to produce 2000 grams of mixed resin filtered as in Example 1. The filter cake was dried in a vacuum oven at 148° C. to constant weight and then molded into an 8"×8"×$\frac{3}{4}$" (20×20×2 cm) block. Compressive creep was measured at 260° C. in both the pressing direction and perpendicular to the pressing direction. After 100 hours at 1000 psi (7 MPa) stress, creep was only 0.26% in the pressing direction and was 0.00% perpendicular to the pressing direction. By comparison, moldings of copolymer resin not containing graphite fibers crept 15.3% during 100 hours at 235° C. and 1000 psi (7 MPa) stress when measured in the pressing direction.

EXAMPLE 3

Four grams of the graphite fibers used in Example 2 were blended with 36 grams of a finely powdered, melt-processible copolymer of tetrafluoroethylene and 16 wt.% hexafluoropropylene of melt viscosity of about $4 \times 10^4$ poises at 380° C. and an average particle size of 30 μm while suspended in a 20% by volume acetone/water solution. The mixture was filtered off in a 3.5"m disc shape and dried. The filter cake was then compression molded at 335° C. Physical properties are compared with unreinforced copolymer below.

| Properties | Fiber Content by Weight | |
|---|---|---|
| | 10% | 0% |
| Flex Modulus, Kpsi | 1,000 | 95 |
| (GPa) | (6.9) | (0.7) |
| Flex Strength, psi | 18,000 | — |
| (MPa) | (124) | — |
| Tensile Strength, psi | 12,000 | 3,000 |
| (MPa) | (83) | (21) |
| % Elongation | 9 | 300 |

EXAMPLE 4

Continuous Hercules "Magnamite" graphite fibers, Type AD, were cut into 26 mm sections. Two grams of these fibers and 38 grams of finely divided powder of melt-processible copolymer of tetrafluoroethylene and 2.9 wt.% perfluoro (propyl vinyl ether) were blended in a mixture of 200 ml of acetone and 800 ml of water for two minutes. The copolymer had a melt viscosity of about $3.1 \times 10^4$ poise at 380° C. and an average particle size of about 10 μm. The solids were filtered off into a 3.5" diameter disc and dried overnight in a vacuum oven at 140° C. The dried resin was compression molded into a 3.5" (9 cm) diameter disc approximately 0.125 inch (3.2 mm) thick at 335° C. using 200 psi (1.4 MPa) for 3 minutes. The physical properties obtained on the molded composition were:

| Flexual Modulus | 518,000 psi | (3.57 GPa) |
|---|---|---|
| Flexual Strength | 11,100 psi | ( 77 MPa) |
| Tensile Strength | 14,800 psi | (102 MPa) |
| Percent Elongation | 6.9% | |

A larger molding (8"×8"×0.7") was prepared for compressive tests from the same copolymer resin and 26 mm graphite fibers. For this experiment 20 grams of graphite fibers and 380 grams of copolymer were blended in 500 ml of acetone and 2000 ml of water in a one-gallon size Waring Blender. Four such preparations were combined in a single filter cake during filtration and dried in a vacuum over at 140° C. to constant weight. The dried composite was molded into an 8"×8"×0.7" (20×20×1.8 cm) block at 940 psi (6.5 MPa) and 345° C. for one hour. Compressive properties were measured in two directions: in the direction of pressing (0.7" dimension) and in the plane of the block (8" dimension). Compressive strength was measured at 3 temperatures, 23° C., 232° C., and 260° C.; while compressive creep was measured at 1000 and 2000 psi at 235° C. The results obtained were:

| | Pressing Direction | Planar Direction |
|---|---|---|
| Compressive Strength | | |
| 23° C. psi | 9000 | 6100 |
| (MPa) | (62) | (42) |
| 232° C. psi | 3670 | 1950 |
| (MPa) | (25) | (13) |
| 260° C. psi | 2590 | 1650 |
| (MPa) | (18) | (11) |
| Compressive Creep | | |
| at 235° C. and 2000 psi | 0.63% at 144 hrs | Fails |
| at 235° C. and 1000 psi | 0.00% at 143 hrs | 2.89% at 120 hrs |

Example 4 shows good strength and little compressive creep in the pressing direction.

EXAMPLE 5

Compositions containing 40% and 60% graphite fibers were prepared by vigorously mixing appropriate amounts of powdered copolymer resin and $\frac{1}{4}$" graphite fibers with 800 ml of 20 vol.% acetone/80 vol.% water in a one quart Waring Blender for two minutes. The resin used was a copolymer of polytetrafluoroethylene and 3.25 wt.% perfluoropropyl vinyl ether, had a melt viscosity of $8.5 \times 10^4$ poises at 380° C., and had an average particle size of 10 μm. Graphite fibers used were Hercules "Magnamite" Type AS $\frac{1}{4}$" chopped graphite fibers. The solids were filtered off in preform shape and dried overnight in a vacuum oven at 120° C. The dried resin was compression molded into a 3.5" (9 cm) diameter disc at 335° C. using 200 psi (1.4 MPa) for five minutes. Amounts used were as follows:

|  | Fiber Loading | |
|---|---|---|
|  | 40% | 60% |
| Copolymer (grams) | 18 | 12 |
| Graphite Fibers (grams) | 12 | 18 |

Properties of the moldings were as follows:

|  | Fiber Loading | |
|---|---|---|
| Property | 40% | 60% |
| Flexural Modulus, psi | 1,677,000 | 873,000 |
| (GPa) | (11.6) | (6.0) |
| Tensile Strength, psi | 14,000 | 4,710 |
| (MPa) | 96.5 | 32.5 |
| % Elongation | 11.3 | 8.4 |

EXAMPLE 6

A composite containing 5% ¼" graphite fibers in melt-processible copolymer of tetrafluoroethylene and perfluoro (propyl vinyl ether) was prepared by blending 22 grams of Hercules "Magnamite" Type AS ¼" graphite fibers with 418 grams of melt-processible copolymer resin in a one-gallon Waring Blender for two minutes with 500 ml isopropanol and 2000 ml of water. The melt-processible copolymer contained 2.9–3.1 wt.% perfluoro (propyl vinyl ether), had a melt viscosity of $3.1–5.2 \times 10^4$ poise at 380° C., and had an average particle size of 5–10 μm. The blending process was repeated four times to give 1760 grams, sufficient for one 8"×8"×0.75" block. The solid material was filtered off and dried overnight in a vacuum oven at 110° C. Half (880 grams) of the voluminous dried material was charged to the mold and cold compacted. The remainder of the dried mixture was added and cold compacted. The cold mold was placed in a hot press and heated for 30 minutes until a thermocouple in the mold registered 345° C. Pressure (188 psi) was applied to the 345° C. mold for one hour and then cooling was started.

Tensile and flexural test specimens were cut from the block in two directions: parallel, in which the plane of the test bars is parallel to the plan of the block and, perpendicular, in which the plane of the test bars is perpendicular to the plane of the block. Physical properties obtained in the two directions were:

|  | Parallel | Perpendicular |
|---|---|---|
| Flexural Modulus, psi | 409,000 | 315,000 |
| (GPa) | (2.82) | (2.17) |
| Flexural Strength, psi | 9,750 | 8,200 |
| (MPa) | (67) | (57) |
| Tensile Strength, psi | 5,600 | 7,620 |
| (MPa) | (39) | (53) |
| Percent Elongation | 4.5 | 6.7 |

Compressive properties were also measured in two directions using 0.5"×0.5"×0.75" blocks cut in the pressing direction and cut perpendicular to the pressing direction.

|  | Pressing Direction | Perpendicular to Pressing Direction |
|---|---|---|
| Compressive Strength psi | 10,250 | 5,220 |
| (MPa) | (71) | (36) |
| Compressive Modulus, psi | 208,000 | 322,000 |
| (GPa) | (1.43) | (2.22) |
| Compressive Creep (235° C. 1000 psi) | 0.27% in 145 hours | 0.26% in 144 hours |
| Compressive Creep (260° C., 1000 psi) | 0.00% in 144 hours | 0.00% in 96 hours Failure at 192 hours |

The embodiments of the invention in which an exclusive property or privilege is claimed are defined as follows:

1. Process for preparing a blend of a melt-fabricable tetrafluoroethylene resin and graphite fibers which comprises mixing (a) melt-fabricable tetrafluoroethylene resin particles having an average size by weight of less than 400 μm in an amount sufficient to result in 50%–90% by weight of the blend being resin particles and (b) graphite fibers, in a mixture of water and a water-miscible organic solvent in which the amount of organic solvent in the mixture of water and solvent is between about 1 and 90 percent by weight of solvent and water, and then separating the blend of resin and graphite fibers from the mixture of water and solvent.

2. The process of claim 1 wherein the amount of organic solvent in the water mixture is between about 5 and 25 percent by weight based on weight of solvent and water.

3. The process of claim 1 wherein the graphite fibers have a length of between about 2 and 30 mm and an aspect ratio of at least 100.

4. The process of claim 2 wherein the water-miscible organic solvent is acetone.

5. The process of claim 2 wherein the water-miscible organic solvent is isopropanol.

6. A blend prepared by the process of claims 1, 2, 3, 4 or 5.

7. A molded article made from the blend prepared in claim 6.

* * * * *